June 30, 1942.  G. F. FELTON  2,288,443
HOLDING DEVICE
Filed Feb. 16, 1942

INVENTOR.
George F. Felton.
BY
Walter C. Ross. Attorney.

Patented June 30, 1942

2,288,443

UNITED STATES PATENT OFFICE 2,288,443

HOLDING DEVICE

George F. Felton, Millers Falls, Mass.

Application February 16, 1942, Serial No. 431,039

3 Claims. (Cl. 248—206)

This invention relates to improvements to holding devices adapted for securement to various objects.

The principal objects of the invention are directed to improvements in holding devices adapted to receive and releasably hold various articles and is characterized by means for securing the device to various objects.

As an example, the device may be secured to a part of an automobile such as the dash and in some convenient location for receiving and releasably holding an article such as a smoking pipe or the like.

Figure 1:
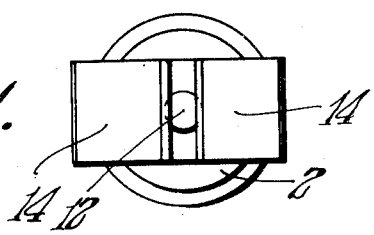
Figure 2:
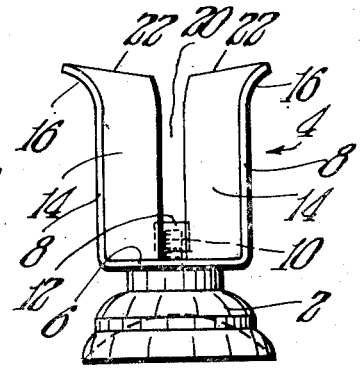
Figure 3:
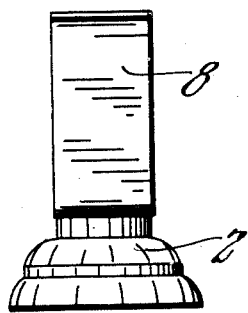

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawing wherein:

Figs. 1, 2 and 3 are plan, and front and side elevational views of a holding device embodying the novel features of the invention.

Referring now to the drawing more in detail, the invention will be fully described.

A support 2 is provided which preferably consists of a rubber suction cup that is yieldable and adapted for securement to any reasonably flat surface.

A U-shaped holder member 4 has an end or base part 6 secured to the support and side arms 8 extending in spaced relation from opposite ends thereof.

The holder is secured to the support by means of a screw 10 associated with the support that passes through a hole in the base 6 and a nut 12 in threaded engagement with the screw bears on the base 6.

On the inner sides of the arms 8 are secured resilient pad members such as 14. These members 14 are preferably of material that is readily yieldable and resilient such as sponge rubber or the like and they are secured to the arms by some suitable means such as adhesive.

The upper or outer end portions of the arms 8 are preferably arranged in a diverging relation as by being curved outwardly at 16, as shown.

The inner adjacent faces of the pad members are preferably spaced as shown at 20 and the upper or outer ends thereof are inclined inwardly and downwardly at 22, as shown.

The diverging end portions of the arms and the end incline of the pads serve to provide a bell mouth entrance to the pads or the slot therebetween which may be varied by changing the curvature of the arms 8 and the angle of the ends of the pads.

The holder is preferably made from strip metal that is somewhat yieldable so as to co-operate with the pads for yieldably receiving therebetween an object that is to be releasably held.

The device may be used for many and various purposes, and the support may be attached to any object so that it serves to support the holder in the desired position.

When attached an article may be inserted between the pads whereby it is releasably held. With a relatively small object such as the stem of a smoking pipe, the pads yield sufficiently to permit the stem to be inserted therebetween while the pads are adapted to yieldingly grip the stem for holding it.

With relatively larger articles not only do the pads yield but the arms 8 are somewhat relatively yieldable so that an article may be easily inserted between the pads and yieldably and releasably held thereby.

The device is constructed and arranged for ready attachment to an object and for receiving and yieldingly holding various articles and by reason of its novel form may be manufactured economically.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A holder device for pipes and the like comprising in combination, a support for attaching the device to an object in the form of a yieldable suction cup, a holder made from a single strip of relatively thin metal in the form of a U having a base and spaced side arms extending in parallelism from opposite ends of the base, means securing the said base to said support, and pads of sponge rubber like material secured to adjacent inner faces of said side arms having adjacent inner faces spaced to provide a slot therebetween.

2. A holder device for pipes and the like comprising in combination, a support for attaching the device to an object in the form of a yieldable suction cup, a holder made from a single strip of relatively thin yieldable metal in the form of a U having a base and side arms extending in parallelism from opposite ends thereof that are relatively yieldable throughout their length upwardly from the base, means securing the said base and said support together, and pads of sponge rubber like material secured to adjacent inner faces of said side arms having adjacent inner faces spaced apart to provide a slot therebetween, the outer extremities of said side arms arranged in relatively diverging relation and the ends of the pads inclined inwardly downwardly from the extremities of the side arms to provide a bell mouth for said slot.

3. A holder device for pipes and the like comprising in combination, a support for attaching the device to an object in the form of a yieldable rubber suction cup, a holder formed from a single strip of relatively thin yieldable metal in the shape of a U having a base and spaced side arms extending from opposite ends of the base in parallelism that are relatively yieldable throughout their length upwardly from the base and having their extremities curving outwardly from one another, means securing said base and holder together, and pads of yieldable sponge rubber secured to inner adjacent faces of said side arms having their inner adjacent faces spaced apart to provide a central slot therebetween and the outer ends of said pads adjacent the outer extremities of the side arms being inclined downwardly and inwardly towards said central slot from the extremities of the side arms and upper adjacent inner faces of the pads curving upwardly and relatively outwardly providing a bell mouth for said central slot.

GEORGE F. FELTON.